United States Patent Office 3,509,220
Patented Apr. 28, 1970

3,509,220
2,9-BIS(3,5-DI-t-BUTYL-4-HYDROXYBENZYL-THIO)-p-MENTHANE
Harry Braus, Springdale, and Jay R. Woltermann, Cincinnati, Ohio, assignors to National Distillers and Chemical Corporation, New York, N.Y., a corporation of Virginia
No Drawing. Filed Nov. 22, 1967, Ser. No. 684,962
Int. Cl. C07c *149/00*
U.S. Cl. 260—609       1 Claim

ABSTRACT OF THE DISCLOSURE 2,9-bis(3,5-di-t-butyl-4-hydroxybenzylthio)-p-menthane can be used to stabilize organic materials.

---

This invention relates to novel compounds and to their use as stabilizers for organic materials. More particularly, this invention is concerned with the use of these compounds as stabilizers and antioxidants for olefin polymers and to the polymer compositions stabilized therewith.

A rapidly expanding industry utilizing polyolefin resins has created a need for stabilizers that will render the finished articles of manufacture more useful, more versatile in application, and more nearly permanent. Polymers of aliphatic olefins have a combination of properties, such as high resistance to stress cracking, high tensile strength, and stability under load, that makes them useful in the manufacture of pipe, film, wire, coatings, or various molded objects such as bottles and the like.

These polyolefins, however, are subject to considerable degradation at the high temperatures that are required in their processing or that may be encountered by the finished articles. They may also be degraded by chain cleavage resulting from oxidation or attack by acids. The molecular breakdown which occurs in these polymers during fabrication is usually evidenced by increased brittleness at low temperature and reduced tensile strength and dielectric properties.

It is customary to incorporate small amounts of stabilizers into the polymer to improve the resistance thereof to thermal and oxidative degradation, such as various amines, diaryl sulfides, phenolic compounds, organic phosphites, and the like. Many of the known stabilizers, however, do not provide the required stabilizing effect while others impart undesired color to the stabilized compositions.

In accordance with this invention, it has been found that a variety of organic materials can be stabilized against thermal and oxidative degradation by incorporating into the polymer composition a small amount of 2,9-bis(3,5-di-t-butyl-4-hydroxybenzylthio)-p-menthane having the formula

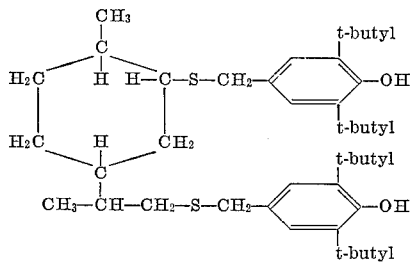

The resulting stabilized compositions can be processed under conditions of elevated temperature and mechanical working without substantial increase in the melt flow rate and without important color change.

Although this invention will be described with regard to the use of the novel compounds as stabilizers for polyolefins, it is to be understood that the compounds are suitable also as stabilizers for other materials, such as elastomers, including both natural and synthetic rubbers; synthetic resins, e.g., vinyl resins, polystyrene, polyamides, polyacetals, and polyesters; fats; gasolines; waxes; soaps; oils; greases; and so forth.

The materials with which this invention will be illustrated are the normally solid homopolymers and copolymers of aliphatic olefins having from 2 to 8 carbon atoms per molecule, such as ethylene, propylene, 1-butene, isobutylene, 2-butene, 1-pentene, and 1-hexene, and mixtures thereof.

In general the amount of agent to be added to the polyolefin depends upon the degree and kind of stabilization desired. The amount of antioxidant can vary from about 0.001 to about 5.0 percent, based on the weight of the polyolefin, with amounts of approximately 0.05 to 0.5 percent being preferred. As a rule, it is preferred to use the minimum amount required to achieve the desired results.

The compounds of this invention can be mixed with the polyolefin in any suitable manner that will effect thorough distribution and dispersion. This can be accomplished in equipment suitable for mixing solids, as by milling the polyolefin with the additive on heated rolls such as are used in the compounding of rubber or on other suitable milling or mixing equipment, such as for example a Banbury mixer or conventional rubber mill. Instead of adding the stabilizing agent to the polymer in the solid or molten state, it can be added to a solution or suspension of polymer in an organic solvent or to an aqueous dispersion thereof and the volatile solvent subsequently removed by vaporization.

The antioxidants of this invention may be supplemented by small amounts of finely dispersed particles of carbon black to shield polyolefin from the deleterious degradative effects of ultraviolet radiation, thereby improving its resistance to light deterioration. Carbon black suitable for use herein includes both activated and unactivated types, such as channel carbon black, furnace carbon black, animal or vegetable carbon black, thermal carbon black, light lamp blacks, acetylene blacks, and the like, and carbon blacks activated in the presence of such materials as oxygen, sulfur, or selenium. The average particle size of carbon black used herein should be below about 1000 angstroms and preferably below about 200 angstroms, so as to ensure a uniform dispersion of the carbon black through the polymer. Amounts of carbon black within the range of about 0.05 to 5.0 percent by weight of the polymer, and preferably about 0.1 to 3.0 percent, are satisfactory. For some polyethylene applications, carbon black concentrations of up to about 50 percent by weight can be present, especially where partially conductive polyethylene-carbon black compounds are employed.

The preparation of the novel stabilizers and their use in polyolefin resin compositions are illustrated by the examples which follow. It is to be understood, however, that these examples are given solely for the purpose of illustration and that the invention is not to be regarded as being limited to any of the specific materials or conditions recited therein except as set forth in the appended claim.

EXAMPLE I

Sodium (9.2 grams, 0.4 atom) was dissolved in 200 ml. of ethanol in an Erlenmeyer flask equipped with a condenser. When the sodium was in solution, the flask was cooled to 10° C. and 40.9 grams of p-menthanedithiol (0.2 M) was quickly added. The contents of the flask, sodium mercaptide, were then added to a dropping funnel.

Into a 2-liter, 3-necked flask equipped with a stirrer, N$_2$ inlet, thermometer, reflux condenser, and dropping funnel was placed 101.9 grams of 3,5-di-t-butyl-4-hydroxybenzyl chloride (0.4 M), prepared by the method disclosed by N. P. Neureiter, J. Org. Chem. 28, 3486–90 (1963), in 100 ml. of ethanol. The mercaptide was added dropwise at flask temperature of 60° C., and the reaction then continued for ½ hour. The precipitated NaCl was filtered, and the filtrate was distilled to remove the solvent. A small sample of the product, 2,9-bis(3,5-di-t-butyl-4-hydroxybenzylthio)-p-menthane, M.P. 76–82° C., was recrystallized from hexane for analysis.

*Analysis.*—Calculated for $C_{40}H_{64}O_2S_2$ (percent): C, 75.0; H, 10.1; S, 10.0. Found (percent): C, 75.1; H, 10.14; S, 10.17.

A satisfactory antioxidant should hold the chemical and physical properties of the original organic material during an accelerated oxidation testing procedure, generally up to three hours' duration. For the following examples, the test procedure consisted of milling one pound of polyethylene in air on a two-roll laboratory mill having a front roll speed of 25 r.p.m. and a back roll speed of 35 r.p.m. with the distance between the two rolls adjusted to maintain a uniform rolling back in the nip and a mill temperature of 320° F. After the polymer started to melt, 300 p.p.m. of the antioxidant was added. Samples (75 grams) were taken after 5, 30, 60, 90, and 180 minutes, and melt index and weight percent carbonyl were determined. The melt index demonstrates the holding characteristics for the physical properties of the polymer; the carbonyl values, the holding of the chemical properties.

EXAMPLE II

| Sample | Melt index ($MI_{10}$)(min.) after— | | | | | Percent of C=O (min.) after— | | | | |
|---|---|---|---|---|---|---|---|---|---|---|
| | 5 | 30 | 60 | 90 | 180 | 5 | 30 | 60 | 90 | 180 |
| A [1] | 5.2 | 5.6 | 6.0 | 5.8 | 0.13 | .006 | .009 | .014 | .023 | .024 |
| B [1] | 1.6 | 2.8 | 4.3 | 4.7 | 5.1 | .013 | .14 | .16 | .70 | .70 |

[1] A is polyethylene+2,9-bis(3,5-di-t-butyl-4-hydroxybenzylthio)-p-menthane; B is polyethylene with no stabilizer.

As can be seen from these data, polyethylene with no stabilizer (sample B) shows poor mill stability and high carbonyl formation at a fast rate. Sample A containing the same polyethylene as sample B plus the compound of this invention has retained its original chemical and physical properties as shown by the figures for melt index and weight percent of C=O, demonstrating the effectiveness of this novel compound as a stabilizer.

What is claimed is:

1. 2,9 - bis(3,5-di-t-butyl-4-hydroxybenzylthio)-p-menthane.

References Cited

Suga et al.: "Chem. Abstracts," vol. 60 (1964), pp. 564–65.

CHARLES B. PARKER, Primary Examiner

D. R. PHILLIPS, Assistant Examiner

U.S. Cl. X.R.

260—45.95; 252—404